(12) United States Patent
Kolarik et al.

(10) Patent No.: US 6,367,867 B1
(45) Date of Patent: Apr. 9, 2002

(54) CAB-TO-BOX DAMPER ASSEMBLY FOR VEHICLES

(75) Inventors: Christopher Lawrence Kolarik, Canton; James Leroy Swayze, S. Rockwood; Melanie Rodriguez Russell, Ann Arbor, all of MI (US)

(73) Assignee: Ford Global Technologies,Inc., Dearborn, MI (US)

( * ) Notice: Subject to any disclaimer, the term of this patent is extended or adjusted under 35 U.S.C. 154(b) by 0 days.

(21) Appl. No.: 09/625,119

(22) Filed: Jul. 25, 2000

(51) Int. Cl.$^7$ .............................................. B62D 27/04
(52) U.S. Cl. .................................. 296/183; 296/190.08
(58) Field of Search ........................ 296/183, 190.07, 296/190.08, 35.1, 35.2; 188/266, 321.11; 267/134, 293

(56) References Cited

U.S. PATENT DOCUMENTS

| | | |
|---|---|---|
| 2,940,768 A | 6/1960 | Thompson et al. |
| 3,841,694 A | 10/1974 | Merkle |
| 4,265,328 A | 5/1981 | Rowa et al. |
| 4,819,980 A | 4/1989 | Sakata et al. |
| 5,160,121 A * | 11/1992 | Bartholomew ............... 267/136 |
| 5,375,823 A * | 12/1994 | Navas ..................... 267/293 X |
| 5,433,423 A * | 7/1995 | Whightsil, Sr. .......... 267/293 X |
| 5,513,730 A * | 5/1996 | Petrovich ................. 267/136 X |
| 5,791,636 A * | 8/1998 | Loziuk ........................ 267/136 |
| 5,848,676 A * | 12/1998 | Deigner ................. 188/321.11 |
| 6,158,356 A * | 12/2000 | Hachet et al. ........... 105/392.5 |

FOREIGN PATENT DOCUMENTS

| | | | |
|---|---|---|---|
| JP | 58-53572 A | 3/1983 | |
| JP | 63219935 A | 9/1988 | |
| JP | 10157655 | 3/1998 | |
| SU | 1643-293 A * | 4/1991 | ............ 296/190.07 |
| WO | WO 83/02486 | 7/1983 | |

\* cited by examiner

Primary Examiner—Joseph D. Pape
Assistant Examiner—Patricia Engle
(74) Attorney, Agent, or Firm—David B. Kelley

(57) ABSTRACT

A cab-to-box damper assembly is provided for a vehicle having a cab and bed. The cab-to-box damper assembly includes at least one damping and/or spring element having a first end and a second end, a first bracket member operatively connecting the first end to a rear of the cab, and a second bracket member operatively connecting the second end to a front of the bed, whereby the damping element reduces relative movement between the bed and the cab.

9 Claims, 3 Drawing Sheets

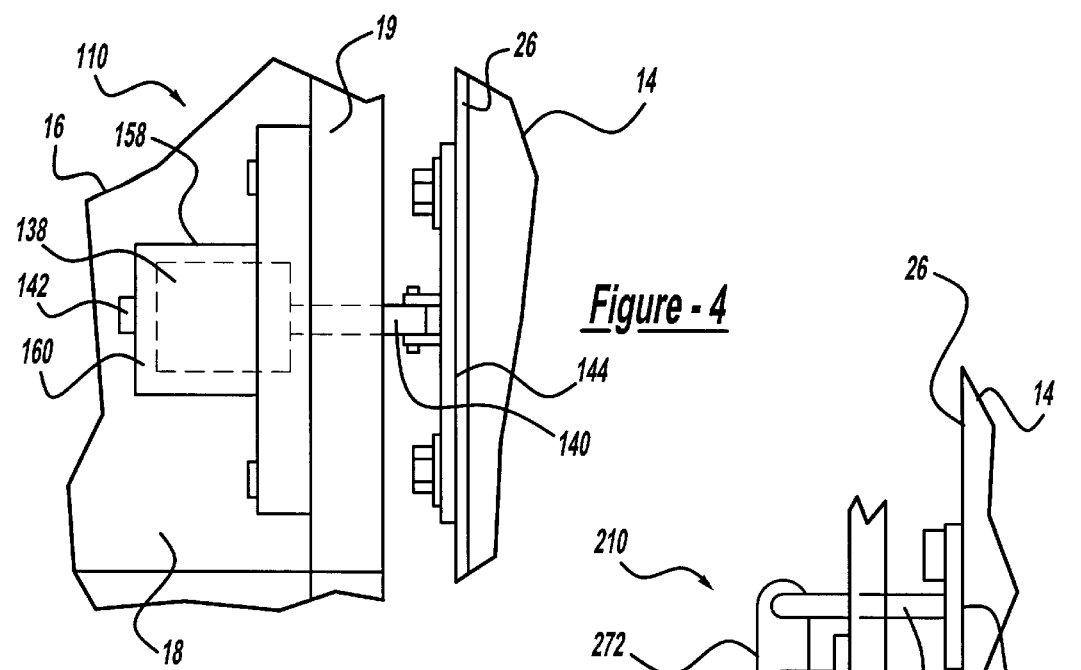
*Figure - 4*
*Figure - 5*
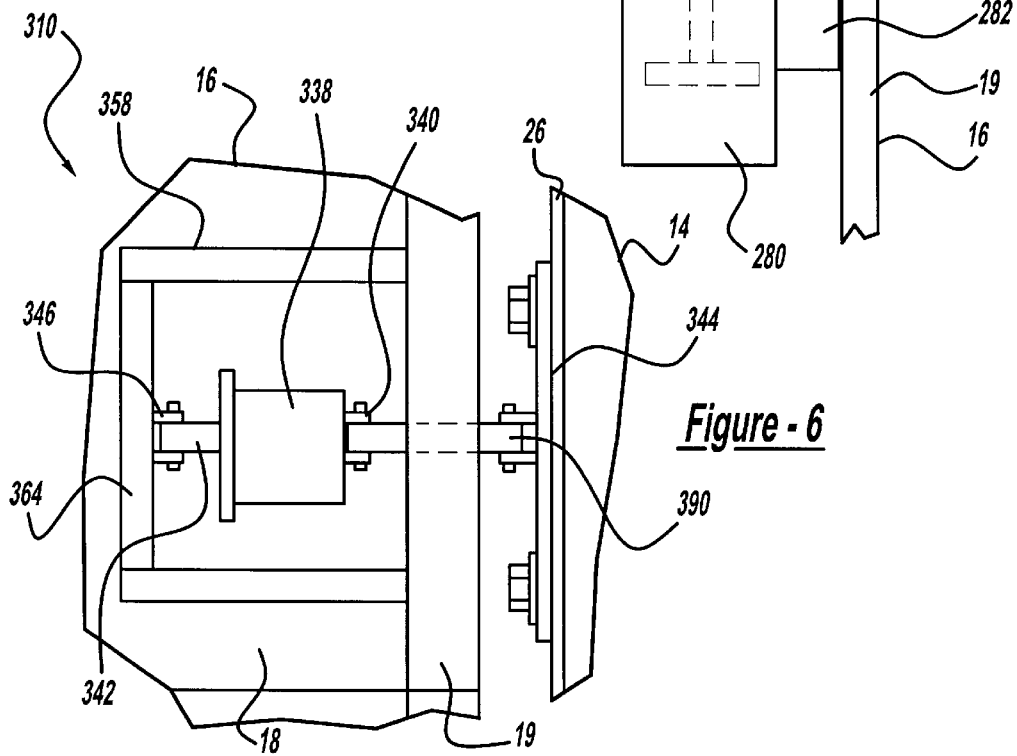
*Figure - 6*

| SEAT TRACK VERTICAL ACCELERATION ||||
|---|---|---|---|
| CONFIGURATION | FREQUENCY(Hz0 | AMPLITUDE | % IMPROVEMENT |
| BASE TRUCK | 7.95 | 4.511 | - |
| TRUCK WITH DAMPER ASSEMBLY | 8.18 | 2.135 | 53 |
| SUV * (TARGET) | 8.30 | 0.967 | 79 |

* MAXIMUM AMPLITUDE IS 2.615 m/s^2 AT 12.27 Hz

US 6,367,867 B1

CAB-TO-BOX DAMPER ASSEMBLY FOR VEHICLES

BACKGROUND OF THE INVENTION

1. Field of the Invention

The present invention relates generally to beds for vehicles and, more specifically, to a cab-to-box damper assembly for a bed of a vehicle.

2. Description of the Related Art

It is known to provide a bed for a vehicle such as a pick-up truck. Typically, the bed is rectangular in shape to define a cargo area and is closed at the end by a tailgate. The tailgate is hinged to the bed to have an upright position to close the end of the bed and a down position to open the end of the bed. The pick-up truck also has a cab for occupants, which is discontinuous with the bed.

One disadvantage of the above is that pick-up trucks exhibit an undamped bounce phenomena. The major response of the pick-up truck is the first bending or beaming mode of the pick-up truck, which is very lightly damped. This shake response is unique to pick-up trucks because of the cab-to-box discontinuity, resulting in significantly lower vehicle bending stiffness than sedan or sport utility type vehicles. The highest shake levels occur when the frequency of the road impacts (which is a function of vehicle speed, wheel base and impact spacing) aligns with the first bending mode of the pick-up truck. This phenomenon is most noticeable on freeways (but not limited to) where discontinuities exist between the large concrete slabs. The operator perception is characterized as bounce or shake at freeway speeds. Other road/tire inputs can also excite the bounce phenomena. Therefore, there is a need in the art to provide a cab-to-box damper to improve pick-up truck ride quality.

SUMMARY OF THE INVENTION

Accordingly, the present invention is a cab-to-box damper assembly for a vehicle having cab and a bed. The cab-to-box damper assembly includes at least one damping and/or spring element having a first end and a second end, a first bracket member operatively connecting the first end to a rear of the cab, and a second bracket member operatively connecting the second end to a front of the bed, whereby the damping element reduces relative movement between the bed and the cab.

One advantage of the present invention is that a cab-to-box damper assembly is provided for a vehicle such as a pick-up truck. Another advantage of the present invention is that the cab-to-box damper assembly incorporates one or more damping and/or spring elements connected between a bed and cab of a vehicle to significantly reduce vehicle bounce and achieve true car-like ride quality. Yet another advantage of the present invention is that the cab-to-box damper assembly provides unique damping and stiffness control of the full bending mode response of the pick-up truck that is induced by road/tire inputs.

Other features and advantages of the present invention will be readily appreciated, as the same becomes better understood, after reading the subsequent description when taken in conjunction with the accompanying drawings.

BRIEF DESCRIPTION OF THE DRAWINGS

FIG. 4 is a fragmentary plan view of another embodiment, according to the present invention, of the cab-to-box damper assembly of FIG. 1.

FIG. 5 is a side elevational view of yet another embodiment, according to the present invention, of the cab-to-box damper assembly of FIG. 1.

FIG. 6 is a fragmentary plan view of still another embodiment, according to the present invention, of the cab-to-box damper assembly of FIG. 1.

DESCRIPTION OF THE PREFERRED EMBODIMENT(S)

Figure 1:
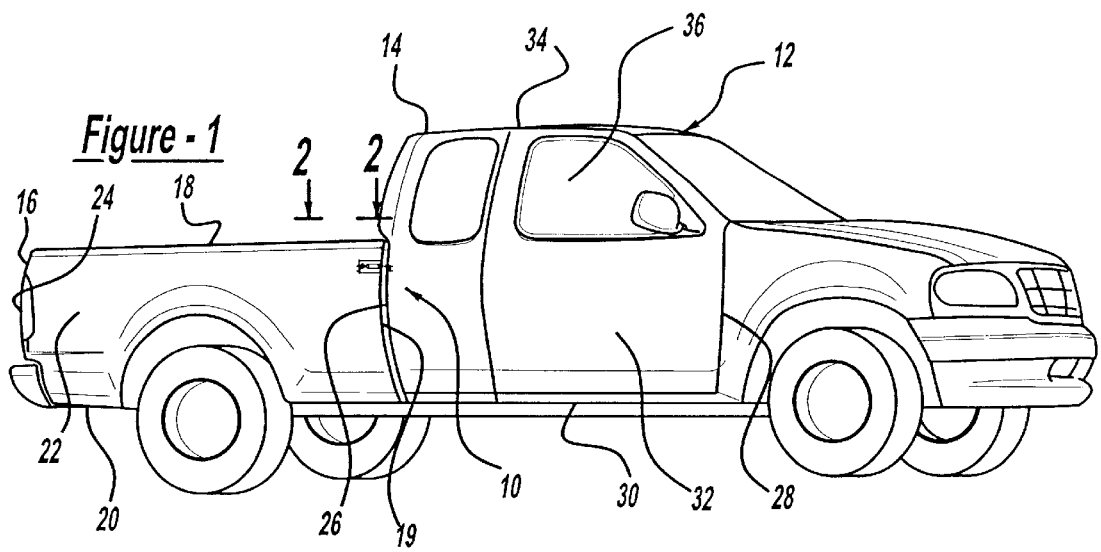
FIG. 1 is a perspective view of a cab-to-box damper assembly, according to the present invention, illustrated in operational relationship with a vehicle.
Figure 2:
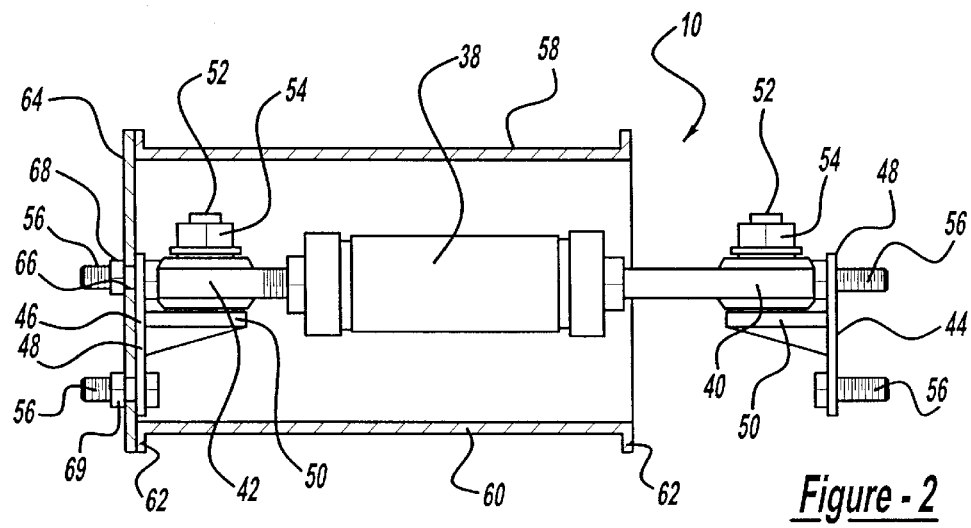
FIG. 2 is a sectional view taken along line 2—2 of FIG. 1.

Referring now to the drawings and in particular FIGS. 1 and 2, one embodiment of a cab-to-box damper assembly 10, according to the present invention, is illustrated in connection with a vehicle such as a pick-up truck, generally indicated at 12. Such pick-up trucks 12 typically include a cab 14 and a box or bed 16 forming a cargo area 18. The bed 16 includes a front 19, floor 20, two sides 22 and a rear tailgate 24, which define the cargo area 18. The cab 14 includes a rear 26, a front 28, floor 30, two sides 32 and a roof 34, which define an occupant area 36 in the cab 14. The cab-to-box damper assembly 10 interconnects the front 19 of the bed 16 and rear 26 of the cab 14 to damp vibrations therebetween. It should be appreciated that the cab 14 and bed 16 are mounted on rails (not shown) forming a frame (not shown) of the pick-up truck 12. It should also be appreciated that, except for the cab-to-box damper assembly 10, the pick-up truck 12 is conventional and known in the art.

Figure 3:
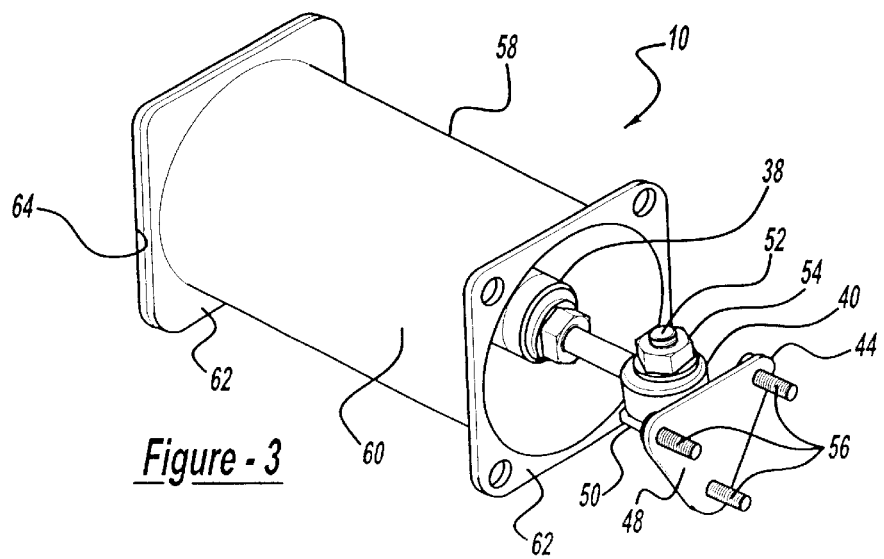
FIG. 3 is a perspective view of the cab-to-box damper assembly of FIG. 1.

Referring to FIGS. 2 and 3, the cab-to-box damper assembly 10 includes at least one damping and/or spring element 38 extending axially or longitudinally and having a first end 40 and a second end 42 opposite the first end 40. The damping element 38 may be of a friction damper type known as Hystec™, which is commercially available from the Lord Corporation of Erie, Pennsylvania. The Hystec™ friction damper is essentially an elastomeric mount and damper in one unit with a surface-effect damper pact containing an elastomer that comes in contact with a sliding or rolling surface and the relative motion between these two surfaces produces both hysteretic and friction damping. The damping element 38 may also be of a hydraulic, hydromount, spring/damper, or bell crank type. Preferably, a damping element 38 is mounted to both top outboard corners of the bed 16.

The cab-to-box damper assembly 10 also includes first and second bracket members 44 and 46, respectively, at the first and second ends 40 and 42, respectively, of the damping element 38. Each of the bracket members 44 and 46 has a side wall 48 extending generally vertically and a base wall 50 extending generally perpendicular to the side wall 48. Each of the bracket members 44 and 46 have a threaded member 52 extending upwardly and generally perpendicular to the base wall 50 to extend through an aperture in the respective first and second ends 40 and 42 of the damping element 38 which is secured thereto by suitable means such as a nut 54 threadably engaging the threaded member 52. Each of the bracket members 44 and 46 has a threaded member 56 extending generally perpendicularly from the side wall 48 for attachment to either the cab 14 or bed 16 in a manner to be described.

The cab-to-box damper assembly 10 may include a housing 58 disposed over the damping element 38 for purposes of assembly. The housing 58 is generally tubular shaped with a generally circular cross-sectional shape. The housing 58 has an annular side wall 60 extending axially and has a flange 62 extending radially from the side wall 60 at each axial end thereof. The housing 58 also includes an end wall 64 at one axial end abutting the flange 62 and secured thereto by suitable means such as welding. The end wall 64 has at least one, preferably a pair of apertures 66 extending axially therethrough to receive the threaded members 56 of the second bracket member 46 which is secured thereto by suitable means such as nuts 68 engaging the threaded members 56. It should be appreciated that the threaded members 56 extend through apertures (not shown) in the rear of the cab 14 and are secured thereto in a similar manner by nuts (not shown) threadably engaging the threaded members 56. It should also be appreciated that the other flange 62 abuts the front 19 of the bed 16 and may be secured thereto by suitable means such as fasteners (not shown). It should further be appreciated that the first end 40 of the damping element 38 extends through an aperture (not shown) in the front 19 of the bed 16. It should be still further appreciated that the ends 40 and 42 of the damping element 38 may rotate relative to the bracket members 44 and 46 to form two ball joint ends.

In operation of the cab-to-box damper assembly 10, the bracket member 46 is connected to the second end 42 of the damping element 38 and the end wall 64 of the housing 58. The housing 58 is disposed in the cargo area of the bed 16 and the flange 62 of the housing 58 abuts the front 19 of the bed 16 and is secured thereto by suitable means such as fasteners. The housing 58 may also be disposed in the rear area of the cab 26. The first end 40 of the damping element 38 extends through an aperture in the front of the bed 16 and the bracket member 44 is secured to the rear of the cab 14 by fasteners. During normal operating conditions of the vehicle 12, the damping element 38 increases damping or stiffness of the connection between the cab 14 and bed 16 and damps the first bending or beaming mode of the vehicle 12 as it is driven over a surface such as a road, thereby reducing or eliminating a shake condition of the vehicle 12. It should be appreciated that the cab-to-box damper assembly 10 adds the necessary damping control of the vehicle/frame bending mode. It should also be appreciated that the type of damping element and installation location was selected to keep the damping forces and durability loads low.

Referring to FIG. 4, another embodiment 110, according to the present invention, of the cab-to-box damper assembly 10 is shown. Like parts of the cab-to-box damper assembly 10 have like reference numerals increased by one hundred (100). In this embodiment, the cab-to-box damper assembly 110 has the second end 142 of the damping element 138 fixed to the housing 158 and the first end 140 is attached to the rear of the cab 14 by the bracket member 144 forming a ball joint therebetween. In this state, the first end 140 may rotate relative to the bracket member 144. The operation of the cab-to-box damper assembly 110 is similar to the cab-to-box damper assembly 10.

Referring to FIG. 5, yet another embodiment 210, according to the present invention, of the cab-to-box damper assembly 10 is shown. Like parts of the cab-to-box damper assembly 10 have like reference numerals increased by two hundred (200). In this embodiment, the cab-to-box damper assembly 210 includes a first rigid rod 270 extending through the aperture in the front 19 of the bed 16 and attached to the rear 26 of the cab 14 by the bracket member 244. The cab-to-box damper assembly 210 also includes a bell crank 272 connected to the end of the first rigid rod 270. The bell crank 272 is generally L shaped and is pivotally connected by a pin 274 to a bracket 276. The cab-to-box damper assembly 210 also includes a second rigid rod 278 having one end connected to the bell crank 272. The cab-to-box damper assembly 210 also includes a damper 280 connected to the other end of the second rigid rod 278 and a bracket member 282 connecting the damper 280 to the front 19 of the bed 16 by suitable means such as fasteners or welding (not shown). The operation of the cab-to-box damper assembly 210 is similar to the cab-to-box damper assembly 10.

Referring to FIG. 6, still another embodiment 310, according to the present invention, of the cab-to-box damper assembly 10 is shown. Like parts of the cab-to-box damper assembly 10 have like reference numerals increased by three hundred (300). In this embodiment, the cab-to-box damper assembly 310 has the second end 342 of the damping element 338 connected to the end wall 364 of the housing 358 to form a compliant end and the first end 340 is attached to a rigid rod 390 to form a compliant end. The other end of the rigid rod 390 is connected to the rear of the cab 14 by the bracket member 344 to form a compliant end. The operation of the cab-to-box damper assembly 310 is similar to the cab-to-box damper assembly 10.

Figures 7A, 7B:
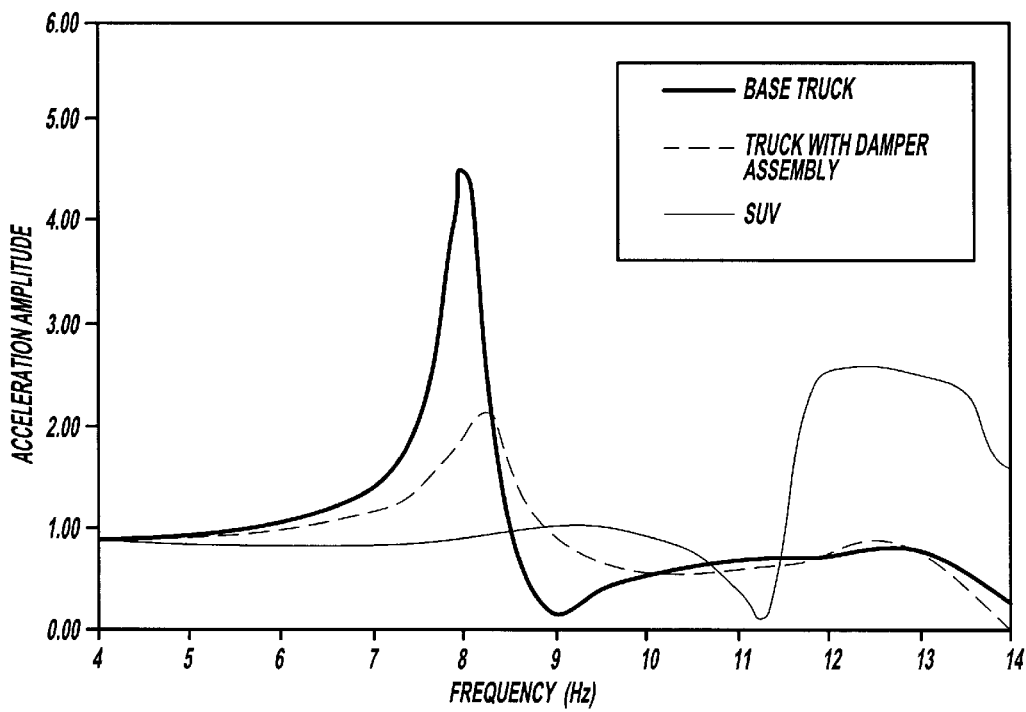
FIG. 7A is a graph of acceleration amplitude versus frequency for a vehicle with and without the cab-to-box damper assembly of FIG. 1.
FIG. 7B is a table of seat track vertical acceleration tabulating acceleration amplitude and frequency for a vehicle with and without the cab-to-box damper assembly of FIG. 1.

As illustrated in FIG. 7A, a graph of acceleration amplitude versus frequency for the vehicle 12 with and without the cab-to-box damper assembly 10 is shown. The cab-to-box damper assembly 10 reduces acceleration amplitude for a given frequency as measured for a seat track. The results of the seat track vertical acceleration are tabulated in a table illustrated in FIG. 7B. As illustrated, the acceleration amplitude was reduced significantly.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A pick-up truck comprising:
   a bed having a front and sides extending from said front to form a cargo space;
   a cab having a rear and sides extending from said rear; and
   a cab-to-box damper assembly comprising a damping element being one of a group comprising a friction, hydraulic, hydromount, spring/damper, or bell crank type interconnecting said rear of said cab and said front of said bed to reduce relative movement between said bed and said cab to reduce a bending moment of said pick-up truck.

2. A pick-up truck as set forth in claim 1 wherein said damping element has a first end and a second end.

3. A pick-up truck as set forth in claim 2 wherein said cab-to-box damper assembly includes a first bracket member operatively connecting said first end to said rear of said cab.

4. A pick-up truck as set forth in claim 3 wherein said cab-to-box damper assembly includes a second bracket member operatively connecting said second end to said front of said bed.

5. A pick-up truck as set forth in claim 1 including a housing disposed about said damping element.

6. A pick-up truck as set forth in claim 5 including fastening means for securing said second end to said housing.

7. A pick-up truck as set forth in claim 1 including fastening means for securely fixing at least one of said first end to the rear of the cab and said second end to the front of the bed.

8. A pick-up truck as set forth in claim 1 including means for compliantly securing at least one of said first end to the rear of the cab and said second end to the front of the bed.

9. A pick-up truck comprising:

a bed having a front, floor and sides extending upwardly and along said sides to form a cargo space;

a cab having a rear and sides extending from said rear; and a cab-to-box damper assembly interconnecting said rear of said cab and said front of said bed comprising a damping element having a first end and a second end, a first bracket member operatively connecting said first end to said rear of said cab, and a second bracket member operatively connecting said second end to said front of said bed, whereby the damping element reduces relative movement between the bed and the cab to reduce a bending moment of said pick-up truck.

* * * * *